United States Patent [19]

Claycomb

[11] 3,997,867
[45] Dec. 14, 1976

[54] WELL BORE DATA-TRANSMISSION APPARATUS

[75] Inventor: Jackson R. Claycomb, Houston, Tex.

[73] Assignee: Schlumberger Technology Corporation, New York, N.Y.

[22] Filed: Sept. 17, 1973

[21] Appl. No.: 398,290

[52] U.S. Cl. .................. 340/18 NC; 340/18 LD; 73/152

[51] Int. Cl.² .......................................... G01V 1/40

[58] Field of Search ........ 340/18 NC, 18 LD, 18 P; 73/152

[56] References Cited

UNITED STATES PATENTS

| 3,789,355 | 1/1974 | Patton | 340/18 LD |
| 3,792,428 | 2/1974 | Harrel et al. | 340/18 LD |
| 3,792,429 | 2/1974 | Patton et al. | 340/18 LD |

*Primary Examiner*—Howard A. Birmiel
*Attorney, Agent, or Firm*—Ernest R. Archambeau, Jr.; William R. Sherman; Stewart F. Moore

[57] ABSTRACT

In the representative embodiment of the present invention disclosed herein, a first ported or grooved signal-producing member is coaxially disposed within the apparatus for dividing drilling fluids flowing through the drill string into two or more longitudinally-directed streams or jets. A second ported or grooved signal-producing member is coaxially arranged in the apparatus adjacent to the first member and adapted for rotation in a transverse plane to cyclically obstruct the fluid jets for developing an alternating or cyclic acoustic signal of a desired frequency in the drilling fluid stream. To provide coded data signals for detection at the surface, an electric motor is coupled to the rotatable member by a unique coupling unit which is cooperatively arranged to be selectively operated by data-coded electrical signal as required to position the rotating member in selected angular orientations in relation to the non-rotating member for selectively varying the phase relationship of the acoustic output signal.

16 Claims, 13 Drawing Figures

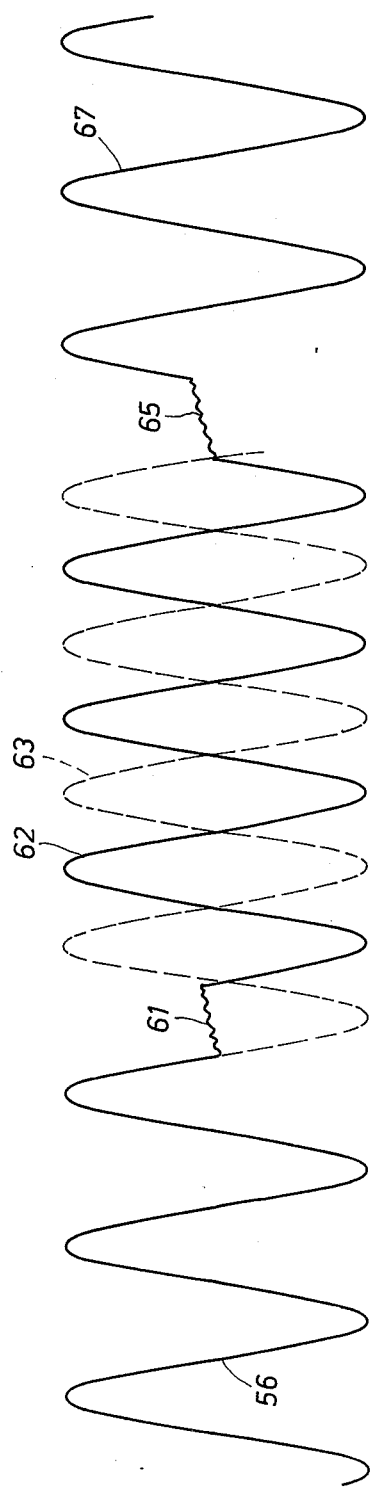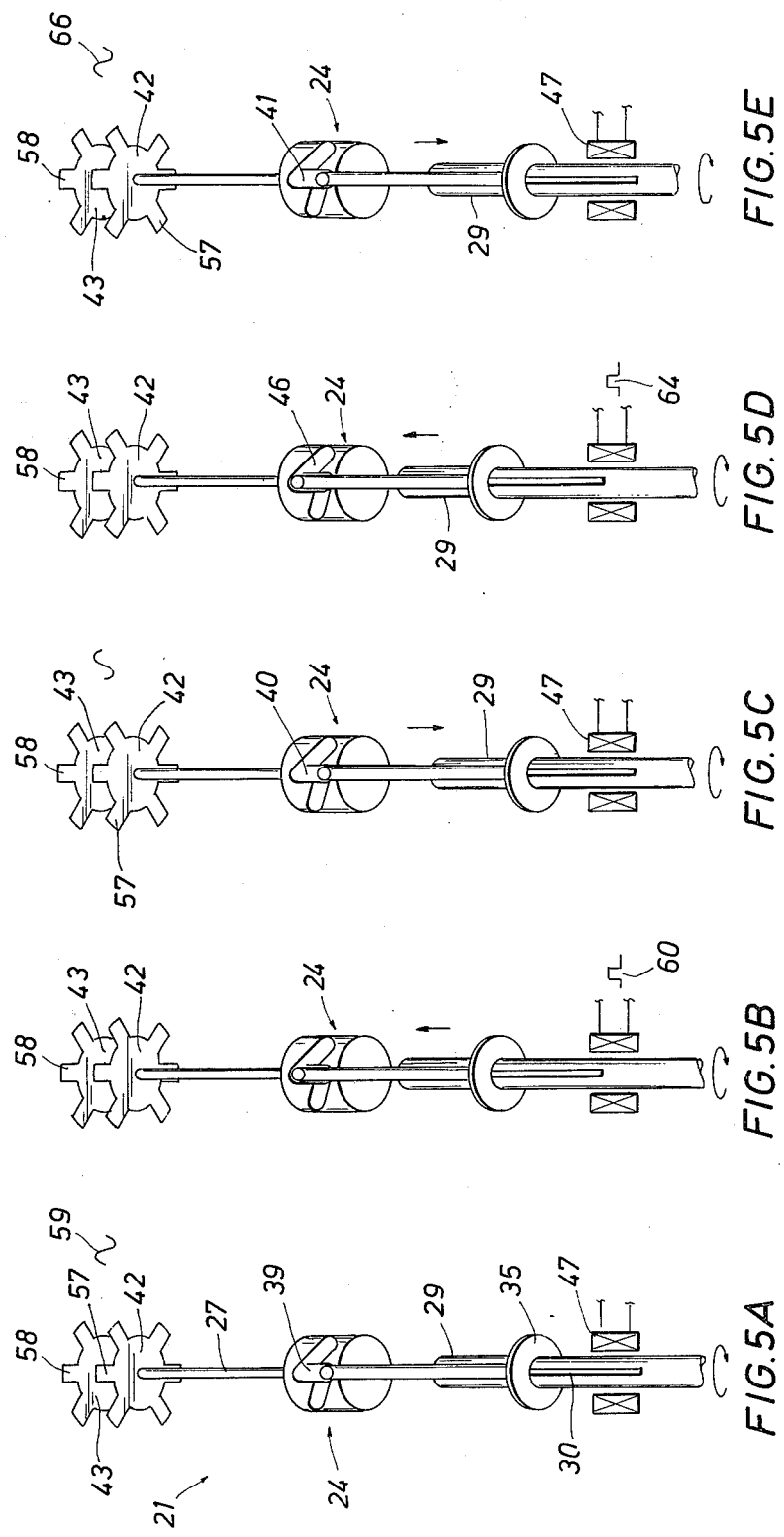

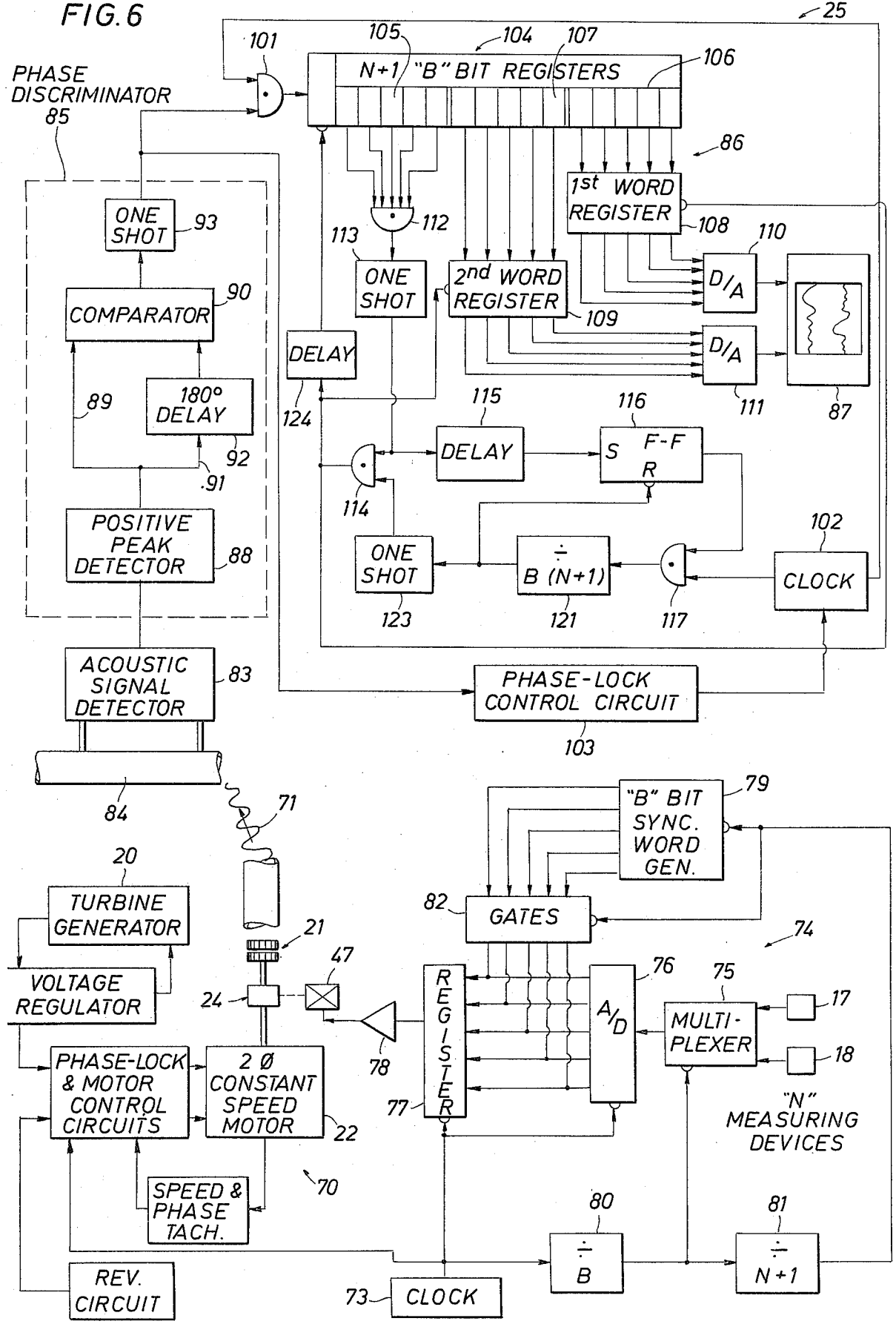

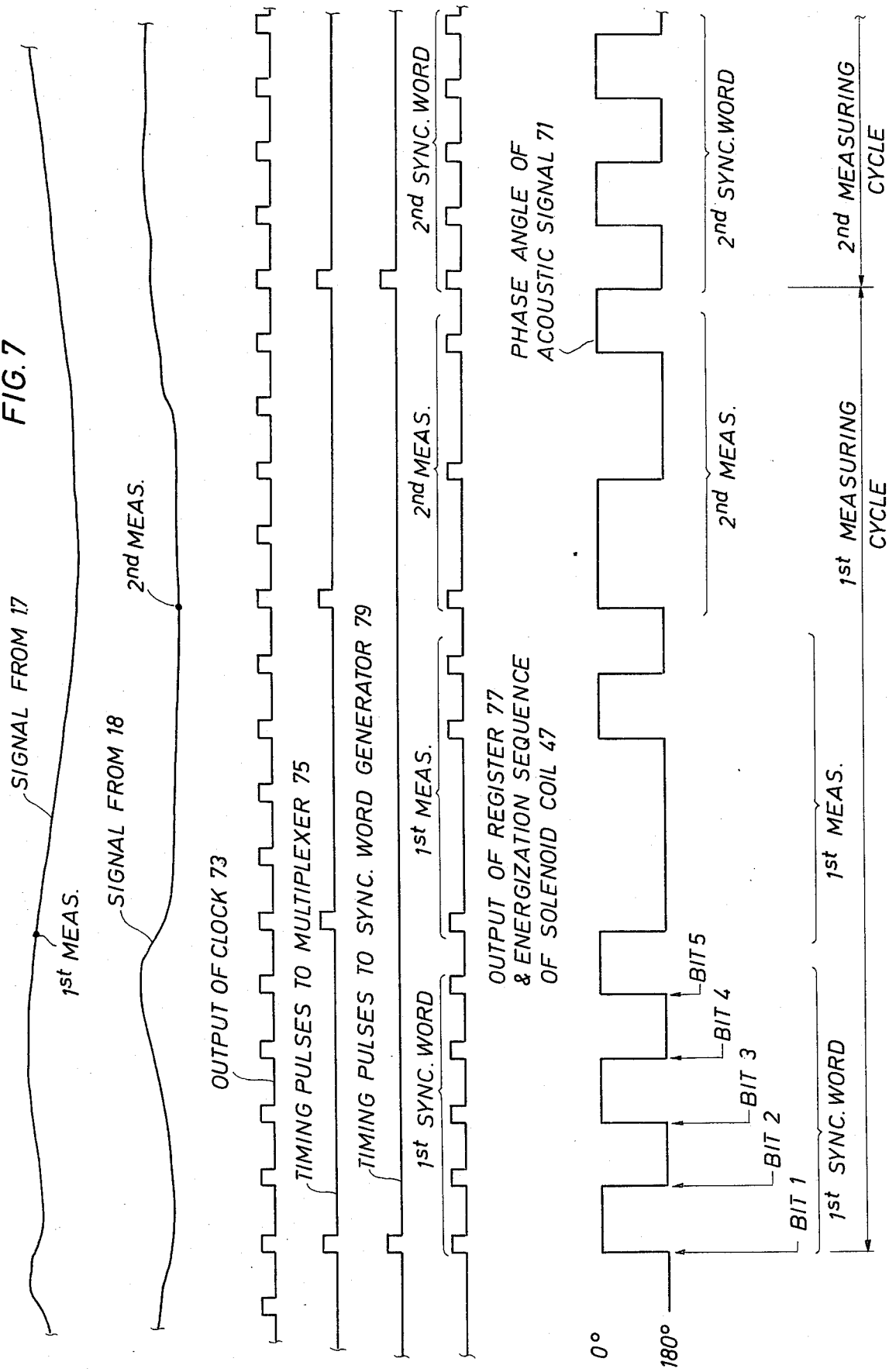

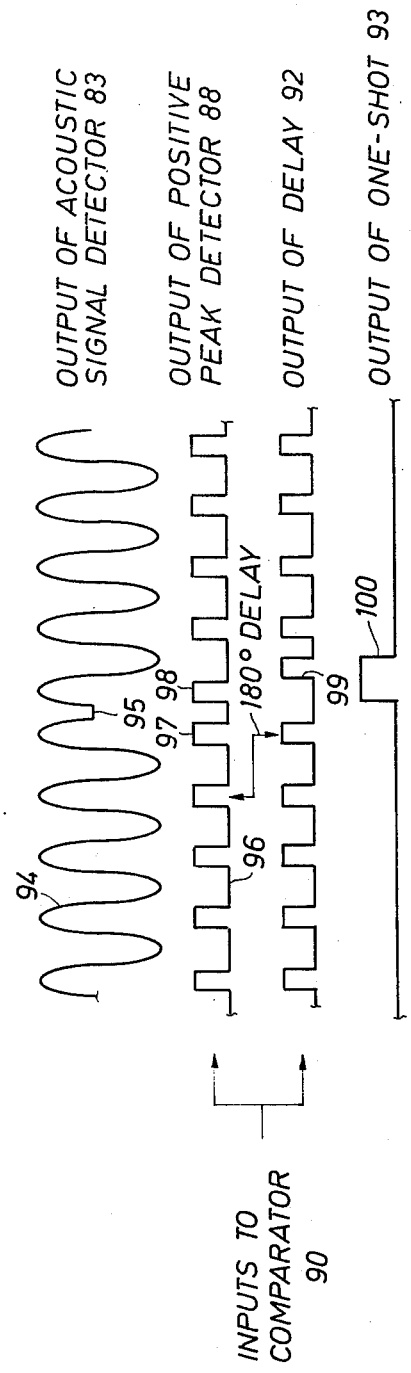
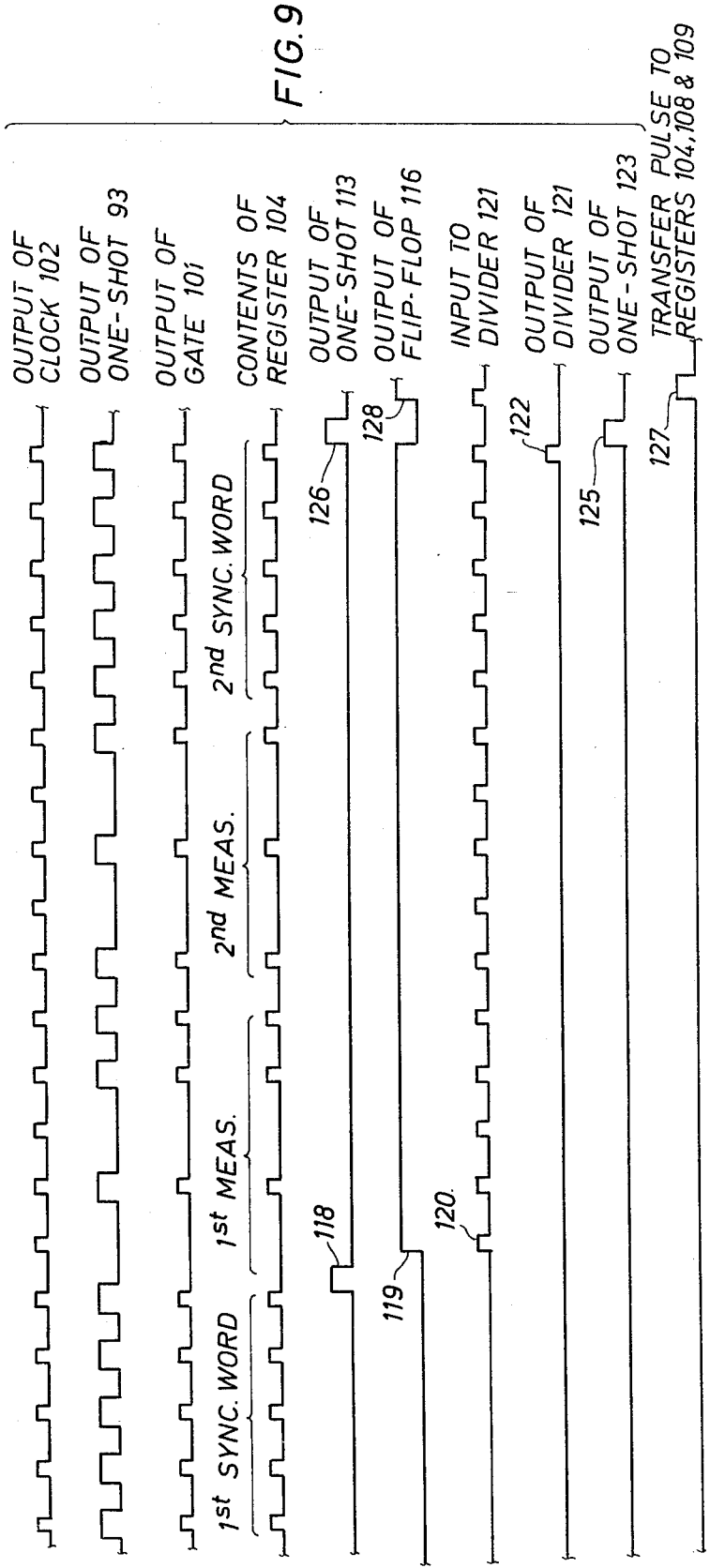

WELL BORE DATA-TRANSMISSION APPARATUS

Various downhole signaling devices have been proposed heretofore for transmitting data representative of one or more measured downhole conditions to the surface during the drilling of a borehole. One of the more-promising devices of this nature is a fluid-dynamic transducer or a so-called "siren" (such as shown generally at 62 in U.S. Pat. No. 3,309,656) that is cooperatively arranged in the drill string for developing acoustic signals in a frequency spectrum of about 0.5 to300 -cycles/second which are transmitted to the surface by way of the circulating mud stream flowing through the drill string. A typical one of these sirens includes a grooved or ported rotor which is rotatively driven by an electric motor to cyclically interrupt one or more jets of drilling mud issuing from a fixed grooved or ported stator for producing acoustic signals at a desired frequency that is related to the design of the siren members, the properties of the drilling mud, and the rotational speed of the rotor. Thus, as described in that patent, by selectively controlling the rotational speed of the rotor in accordance with binary-coded electrical signals representative of a measured downhole condition, the siren will be alternately operated at selected upper and lower frequencies as required for successively transmitting binary-coded acoustic signals to the surface which are indicative of the measured downhole conditions. It will, of course, be recognized that this frequency, modulation technique makes it necessary to accurately determine the frequency of each successive portion of the received signal in order to properly decode the data being transmitted. This, however, often results in an undesirably low rate of data transmission where the received signal is relatively weak since each portion thereof must be unduly prolonged to assure accurate determination of its frequency.

Another operating technique which has also been proposed heretofore for use with acoustic signalers of this nature is to selectively control a constant-speed motor driving the siren rotor so as to either briefly retard or briefly advance the rotation of the rotor. This will, of course, correspondingly vary the phase relationships of successive portions of the acoustic output signal either with respect to previous output signals or with respect to a selected reference signal for developing a phase-coded output signal which is a binary representation of the one or more downhole measurements. Those skilled in the art will, however, appreciate that the electrical circuitry required for producing such phase-coded acoustic output signals will inherently be quite complex and, therefore, subject to malfunction under the adverse well bore conditions usually encountered.

Accordingly, it is an object of the present invention to provide a new and improved well bore data-transmission system for reliably and simply producing phase-coded acoustic signals in well bore fluids such as a circulating stream of drilling mud for rapidly and accurately conveying data to the surface which is representative of one or more downhole conditions.

This and other objects of the present invention are attained by providing a well tool adapted to be connected in a pipe string such as a drill string having a drill bit dependently coupled thereto and arranged for excavating a borehole as a drilling fluid is circulated through a fluid passage in the tool and the drill string. To generate distinctive acoustic signals in the circulating fluid representative of one or more downhole measurements, acoustic-signaling means on the tool include a motor adapted for rotatively driving a flow-controlling member which is positioned immediately adjacent to another flow-controlling member arranged within the fluid passage so as to cyclically vary the degree of flow obstruction presented by the two flow-controlling members in cooperation with one another for producing an acoustic output signal of a given frequency. The acoustic-signaling means further include selectively-actuated coupling means connecting the motor to the rotating flow-controlling member and adapted to operate in response to suitably-coded electrical signals representative of one or more downhole measurements for mechanically shifting the rotating member between selected angular positions in relation to the other flow-controlling member thereby successively varying the phase relationship of the output signal as required to produce a phase-coded acoustic signal representative of these downhole measurements which can be detected by suitable signal-detecting means at the surface.

The novel features of the present invention are set forth with particularity in the appended claims. The invention, together with further objects and advantages thereof, may be best understood by way of the following description of exemplary apparatus employing the principles of the invention as illustrated in the accompanying drawings, in which:

Figure 2:
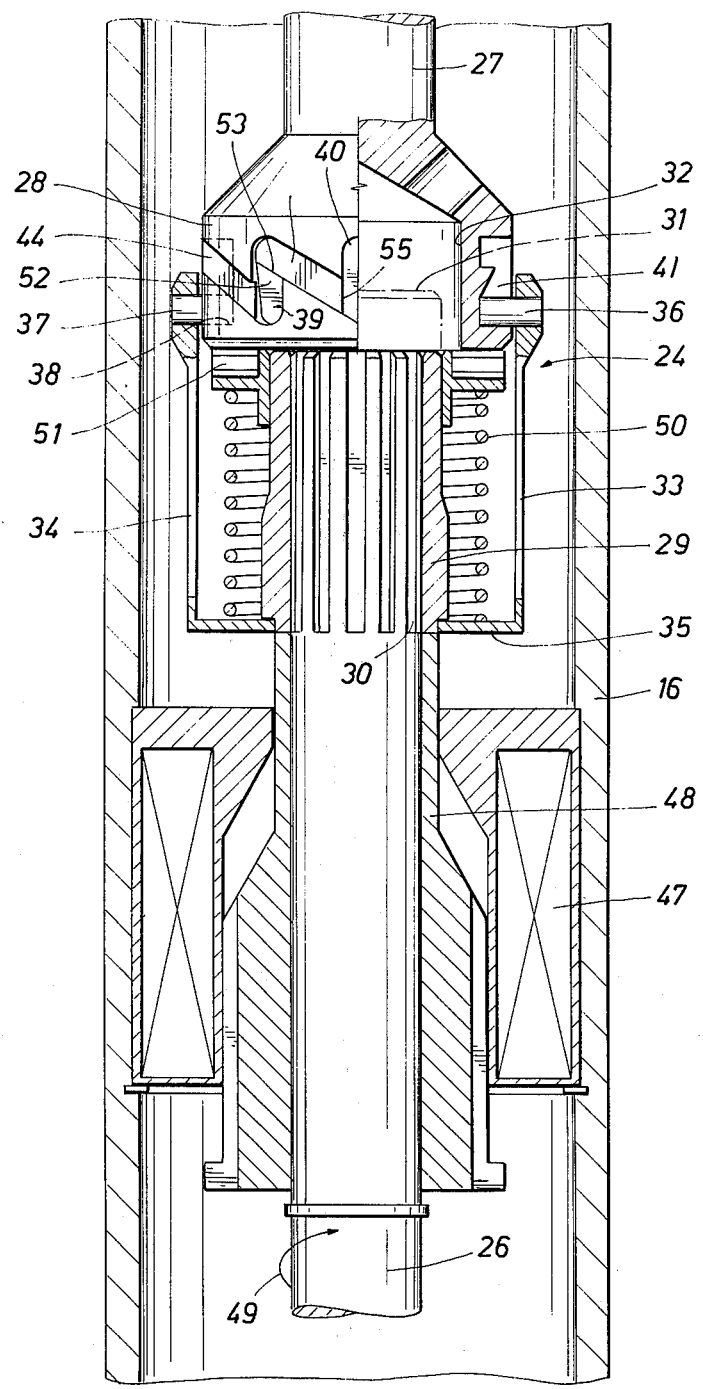
FIG. 2 depicts a preferred embodiment of selectively-actuated coupling means which may be used for operating the acoustic signaler employed with the well tool shown in FIG. 1 to produce phase-coded acoustic signal.

FIGS. 5A–5E schematically illustrate the operation of the new and improved tool of the present invention as the coupling means shown in FIG. 2 are successively actuated;

FIG. 6 shows typical downhole and surface electrical circuits which may be employed with the new and improved well tool of the present invention; and FIGS. 7–9 graphically represent significant aspects in the operation of the present invention.

Figure 1:
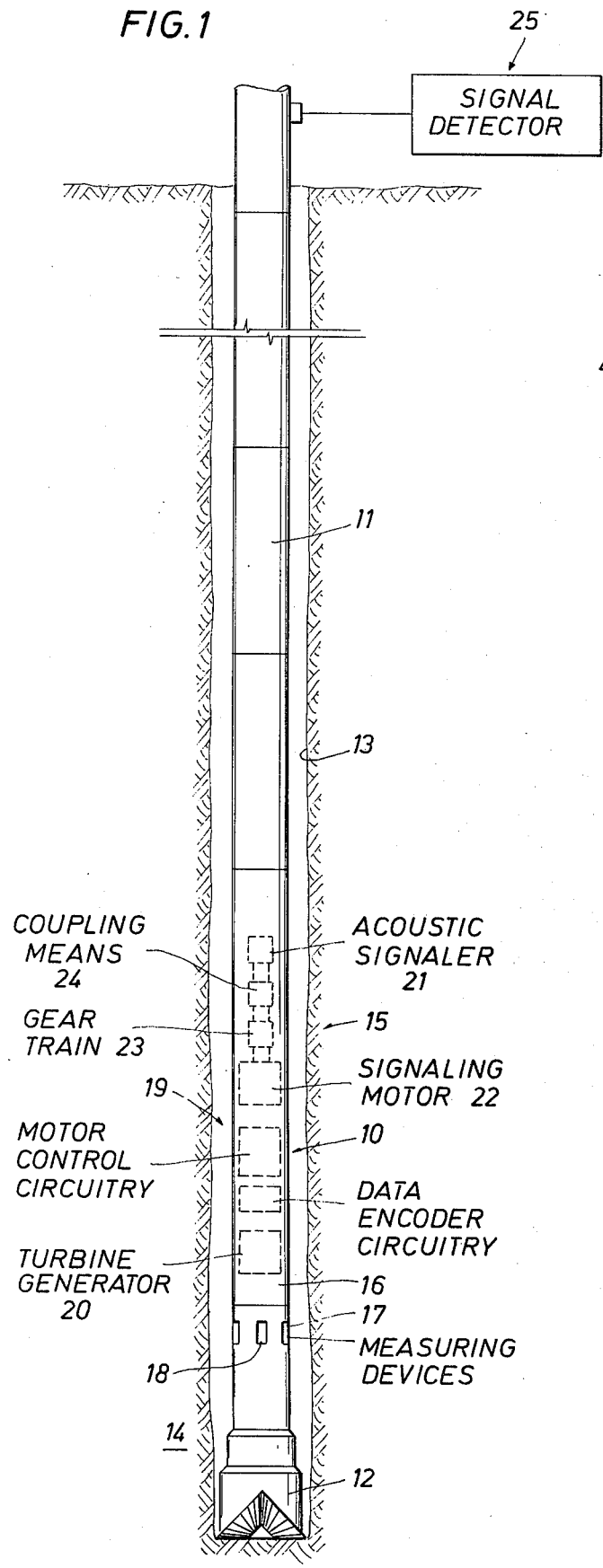
FIG. 1 shows a new and improved well tool arranged in accordance with the present invention as it will appear while coupled in a drill string during the course of a typical drilling operation.

Turning now to FIG. 1, a new and improved well tool 10 arranged in accordance with the present invention is depicted coupled in a typical drill string 11 having a rotary drill bit 12 dependently coupled thereto and adapted for excavating a borehole 13 through various earth formations as at 14. As the drill string 11 is rotated by a typical drilling rig (not shown) at the surface, substantial volumes of a suitable drilling fluid or so-called "mud" are continuously pumped downwardly through the tubular drill string and discharged from the drill bit 12 to cool the bit as well as to carry earth borings removed by the bit to the surface as the mud is returned upwardly along the borehole 13 exterior of the drill string. It will be appreciated, therefore, that the circulating mud stream flowing through the drill string 11 serves as a transmission medium that is well suited for transmitting acoustic signals to the surface at the speed of sound in the particular drilling fluid.

In accordance with the principles of the present invention, data-transmitting means 15 are arranged on the tubular body 16 of the well tool 10 and include one or more condition-responsive devices, as at 17 and 18, coupled to appropriate electrical circuitry 19 operatively arranged in the tool body for sequentially producing coded electrical data signals that are representative of the measurements being obtained by the condition-responsive devices. It will, of course, be appreciated that these condition-responsive transducers 17 and 18 will be adapted as required for measuring such downhole measurements as the pressure, the temperature, or the resistivity or conductivity of either the drilling mud or adjacent earth formations as well as various formation conditions or characteristics which are typically obtained by present-day wireline logging tools. Although a self-contained battery power supply could be employed in the downhole circuitry 19, as shown at 20 it is preferred to employ a reaction-type turbine driving a generator for utilizing the circulating mud stream as a motivating source to generate electrical power for operation of the new and improved data-transmitting means 15.

The data-transmitting means 15 further include a rotatively-driven acoustic signaler or signal-generating siren 21 which is arranged to cyclically interrupt or obstruct the drilling fluid flowing through the drill string 11 for producing an acoustic signal at a designated frequency. As will subsequently be described in greater detail, the signaler 21 is operatively coupled to an electric motor 22 by a typical gear train 23 and selectively-actuated coupling means 24 uniquely arranged to respond to the data-encoded electrical signals from the downhole circuitry 19 for operating the acoustic signaler as required to produce a correspondingly-encoded acoustic output signal. This signal is continuously transmitted to the surface through the mud stream flowing within the drill string 11 as a series of discrete signal portions which are encoded representations or data signals indicative of the downhole conditions respectively sensed by the condition-measuring devices 17 and 18. As will subsequently be explained, when these signal portions reach the surface, they are decoded and converted into meaningful data-conveying indications or records by means such as suitable signal detecting-and-recording apparatus 25.

As previously mentioned, acoustic signalers or sirens, as at 21, typically include a non-rotating member or stator having a plurality of equally-distributed ports or circumferentially-spaced radial teeth and which is coaxially arranged in the circulating mud stream for dividing the flowing mud into a series of longitudinally-directed jets or individual streams. A similar or complementally-arranged rotor member is positioned immediately adjacent to the stator and rotated about a longitudinal axis so that as the teeth or ports on the rotor successively pass through the fluid jets, a cyclic acoustic signal will be produced in the circulating mud stream. It will, of course, be appreciated that each time the rotor of a given acoustic signaler, as at 21, is angularly oriented in relation to the stator so as to momentarily present a major flow obstruction to the circulating mud stream, the resulting acoustic signal will be at its maximum amplitude. Then, as the rotor incrementally rotates further, the amplitude of the acoustic signal produced by the signaler 21 will correspondingly approach a zero or minimum value as the rotor successively presents less and less of an obstruction to the flow of the circulating mud stream. Further incremental rotation of the rotor will, of course, cause a corresponding increase in signal amplitude as the rotor again approaches its next maximum-obstruction angular position.

Those skilled in the art will recognize, therefore, that the continuous rotation of the rotor in the signaler 21 will produce an acoustic output signal having a cyclic waveform with successively alternating positive and negative peaks of maximum amplitude. Thus, uninterrupted rotation of the rotor will steadily produce a typical alternating or cyclic signal at a designated frequency which will have a determinable phase relationship in relation to some other alternating signal such as a selected reference signal. On the other hand, by momentarily advancing or retarding the rotation of the rotor, the rotor can be selectively shifted to a different angular position in relation to the stator than the position which the rotor would have occupied had it continued to rotate without interruption. this selective shifting of the rotor will, therefore, result in changing the acoustic signal to a different phase relationship than that of the previous output signal from the signaler 21. Thus, in one instance, a binary-coded acoustic signal can be readily produced by selectively shifting the actual phase angle of the signal back and forth between two arbitrarily-selected phase relationships. It will, of course, be recognized also that either a change in phase or the absence of a phase change during a given time interval will alternatively provide a binary-coded signal without it being necessary to determine the actual phase relationship of the successive portions of the signal. Thus, in either case, a phase-coded acoustic signal can be readily produced by selectively advancing or retarding the rotor of the signaler 21 in response to one or more data-coded electrical signals. It will, of course, be readily apparent that the particular design or style of the signaler 21 used in the tool 10 is immaterial; and, that as far as achieving the objects of the present invention, a phase-coded cyclic signal can be produced with any suitable type of acoustic signaler. Thus, the signaler 21 could just as well be either the siren shown in U.S. Pat. No. 3,309,656 or any one of the three new and improved acoustic signalers shown in U.S. Pat. No. 3,764,968, 3,764,969 or 3,764,970, each of which are incorporated by reference herein.

Turning now to FIG. 2, a preferred embodiment is shown of the selectively-actuated coupling means 24 arranged in accordance with the principles of the present invention. As discussed above, since the particular arrangement of the acoustic signaler 21 is not pertinent to understanding the present invention, the signaler is not illustrated in FIG. 2. As depicted in FIG. 2, the new and improved coupling means 24 are cooperatively arranged within the tool body 16 between the upper end of a rotatable driving shaft 26 having its lower end coupled to the gear train 23 (now seen in FIG. 2) and the lower end of a rotatable driven shaft 27 having its upper end coupled to the rotor of the acoustic signaler 21 (not seen in FIG. 2). It will be appreciated that in the preferred embodiment of the new and improved tool 10, the shafts 26 and 27 are suitably journaled for rotation by means of typical bearings (not shown) coaxially mounted at spaced intervals within the tool body 16 and arranged so that the acoustic signaler 21, the coupling means 24, the gear train 23 and the driving motor 22 are in coincidental alignment with one another.

As depicted, in the preferred embodiment of the coupling means 24, the lower end of the driven shaft 27 is outwardly enlarged, as at 28, to define an external cylindrical surface of a substantial diameter which terminates immediately adjacent to the upper end of the driving shaft 26. The coupling means 24 further include an elongated sleeve 29 which is slidably mounted on the upper end of the driving shaft 26 and co-rotatively secured thereto by means, such as one or more complementally-formed longitudinally-aligned spline-and-groove arrangements 30, permitting the sleeve to slide longitudinally along the driving shaft between its illustrated lower position and an elevated position as depicted by the dashed lines 31. To accommodate the sliding movement of the sleeve 29 to its elevated position, the cylindrical enlargement 28 on the lower end of the driven shaft 27 is counterbored, as at 32, for loosely receiving the upper end of the sleeve.

It will, of course, be recognized that the shafts 26 and 27 must be co-rotatively coupled together so that the driven shaft will be rotatively driven upon rotation of the driving shaft. To accomplish this, the new and improved coupling means 24 further include means such as a pair of longitudinally-directed members or upright fingers 33 and 34 having their lower ends secured on opposite sides of an enlarged flange 35 on the lower end of the sleeve 29 and their upper ends respectively carrying inwardly-projecting keys or lugs 36 and 37 that are respectively received loosely within one of a group of outwardly-opening longitudinally-directed grooves, as at 38–41, formed at uniformly-spaced intervals around the circumference of the shaft enlargement 28. Thus, by virtue of the spline-and-groove arrangement 30, rotation of the driving shaft 26 will rotate the sleeve 29 and the longitudinal fingers 33 and 34 so that the lugs 36 and 37 will respectively engage the sides of their associated grooves as at 38–41 for transmitting rotational torque to the driven shaft 27. Since the fingers 33 and 34 transmit torque between the two shafts 26 and 27, the fingers must, of course, have sufficient rigidity to withstand the corresponding lateral loads.

Figure 3:
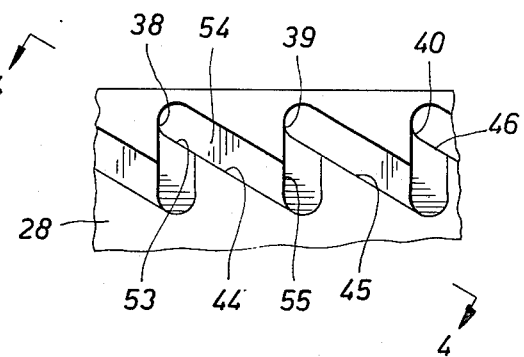
FIG. 3 is an enlarged developed view of a portion of the coupling means shown in FIG. 2.

It will, therefore, be recognized that so long as the lugs 36 and 37 respectively remain in a given pair of the longitudinal grooves 38–41, the signaler 21 will steadily produce a cyclic acoustic signal having an unvarying phase relationship with respect to a given reference. However, as schematically illustrated in FIG. 3, the new and improved coupling means 24 further include means for selectively changing the angular position of the signaler rotor 42 (FIGS. 5A–5E) in relation to the signaler stator 43 (FIGS. 5A–5E). In the preferred manner of accomplishhing this, the longitudinal grooves, as at 38–40, are uniformly spaced at selected angular intervals completely around the shaft enlargement 28 so that by shifing the lugs 36 and 37 from whichever grooves they are then respectively occupying to the next-adjacent grooves, the angular position or orientation of the driving shaft 26 in relation to the driven shaft 27 will be changed by an increment equal to the angular or circumferential spacing between adjacent grooves. To allow the lugs 36 and 37 to be selectively shifted from one to another of the several grooves as at 38–40, the upper end of each one of the longitudinal grooves is communicated with the lower end of the next-adjacent longitudinal groove by way of an inclined or diagonally-oriented groove, as at 44–46.

It will be seen, therefore, from FIG. 3, that the longitudinal grooves, as at 38–40, and the diagonal grooves, as at 44–46, together cooperatively define an endless alternating of zig-zag path around the complete circumference of the enlarged shaft portion 28. Thus, by successively reciprocating the sleeve 29 so as to carry the lugs, as at 36, first upwardly along one of the longitudinal grooves 38–40 and then back downwardly along the immediately-adjacent one of the inclined grooves 44–46, the driving shaft 26 will be progressively moved into as many different angular positions in relation to the driven shaft 27 as there are longitudinal grooves. In other words, each time a given one of the lugs, as at 36, occupies a given one of the longitudinal grooves, as at 39, the driving shaft 26 will have a corresponding angular orientation in relation to the driven shaft 27; and this orientation will be changed by a predetermined angular increment once this lug is moved by way of the appropriate one of the interconnecting diagonal grooves, as at 45, into the next-adjacent longitudinal groove, as at 40.

In the preferred embodiment of the new and improved coupling means 24, the lugs 36 and 37 are operatively shifted from one to another of the longitudinal grooves 38–41 by selectively-controlled signal-responsive actuating means such as a typical electrical actuator having an annular solenoid coil 47 and a reciprocating tubular plunger 48 which are coaxially mounted in the tool body 16 around the driving shaft 26 just below the sleeve 29. In this manner, by cooperatively arranging the plunger 48 to be moved upwardly against the flange 35 on the lower end of the sleeve 29 upon energization of the coil 47 by an appropriate electrical data signal, each of the lugs, as at 36, will be shifted from the lower end of whichever longitudinal groove, as at 39, it is then respectively occupying to the upper ends of this groove. Accordingly, assuming that the driving shaft 26 is being rotatively driven in the direction shown by the arrow 49, the rotation of this shaft will urge the leading edges of the lugs, as at 36, against the opposing wall surfaces at the upper ends of the next-adjacent diagonal groove, as at 45. Then, once the coil 47 is de-energized, the continued rotation of the shaft 26 will serve to longitudinally shift the sleeve 29 back downwardly along the mating spline-and-groove arrangement 30 by virtue of the camming action of the leading edges of the lugs, as at 36, against the opposing surfaces of the diagonal grooves, as at 45. To facilitate the return of the sleeve 29 to its normal position, biasing means are preferably provided such as a spring 50 which is compressively disposed between the flanged end 35 of the sleeve and a suitable bearing 51 that is coaxially disposed around the upper end of the sleeve and slidably engaged with the lower end of the driven shaft 27.

Although it can be reasonably assumed that the continued rotation of the driving shaft 26 will ordinarily be sufficient to assure the return or downward movement of the lugs 36 and 37 along the next-adjacent one of the inclined grooves, as at 44–46, it is preferred that the new and improved coupling means 24 further include a positive arrangement for preventing downward or retrograde movement of the lugs along the longitudinal grooves. Accordingly, the bottom surface of each of the longitudinal grooves, as at 38–41, is shaped so as to define an outwardly-inclined camming ramp, as at 52 (FIG. 2), which begins just above the bottom end of the groove and terminates in an upwardly-facing shoulder, as at 53, just below the upper end of that groove. Thus, once a lug, as at 36, is moved the full length of one of these upwardly and outwardly inclined ramps, as at 52, the upwardly-facing shoulder 53 at the end of this ramp will prevent the lug from moving back downwardly in that particular one of the longitudinal grooves, as at 38, when the solenoid coil 47 is de-energized. It should be noted that although the fingers 33 and 34 carrying the lugs 36 and 37 are sufficiently stiff to transmit torque from the driving shaft 26 to the driven shaft 27, the fingers are cooperatively arranged to flex sufficiently in a radial direction as required to accommodate the inward and outward movements of the lugs caused by their longitudinal travel along the inclined ramp 52.

Figure 4:
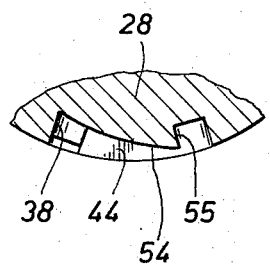
FIG. 4 is a cross-sectional view taken along the line "4—4" in FIG. 3.

As an added precaution, the bottom surface of each of the diagonal grooves 44–46 is also shaped similarly to the longitudinal grooves 38–41 so as to define an outwardly and downwardly inclined camming ramp, as at 54 (FIG. 4), which terminates in a laterally-facing shoulder, as at 55, at the respective junctions between the lower ends of each of the diagonal grooves and the longitudinal grooves. Thus, once the solenoid plunger 48 has shifted the sleeve 29 upwardly so as to carry the lugs 36 and 37 to the upper ends of the particular longitudinal grooves 38–41 they are then occupying. the upwardly-directed shoulders, as at 53, will prevent the lugs from returning back downwardly through the longitudinal grooves after the plunger is retracted. Moreover, once the continued rotation of the driving shaft 26 has caused the lugs 36 and 37 to be cammed downwardly along the opposing faces of the inclined grooves 44–46 to return the sleeve 29 to its lower position, the lateral shoulders, as at 55, will assure that the lugs will be directed back up the next-adjacent ones of the longitudinal grooves 38–41 upon the next energization of the solenoid coil 47.

Accordingly, it will be recognized that so long as the solenoid coil 47 is de-energized, the lugs 36 and 37 on the fingers 33 and 34 will remain at the bottom of those of the longitudinal grooves 38–41 they are then respectively occupying. In this position, rotative torque will be transmitted from the driving shaft 26 by way of the spine-and-groove arrangement 30 to the sleeve 29 and the fingers 33 and 34 and, by virtue of the engagement of the finger lugs 36 and 37 against the side walls of their respective longitudinal grooves 38–41, to the enlarged lower portion 38 of the driven shaft 27. When it is desired to vary the existing angular relationship between the two shafts 26 and 27 (and, as a result, the orientation of the rotor 42 relative to the stator 43), the solenoid coil 47 is momentarily energized by a data signal so as to drive the sleeve 29 upwardly from its normal lower position to its dashed-line elevated position 31. Then, once the lugs 36 and 37 are shifted above the shoulders, as at 53, near the upper ends of the longitudinal grooves 38–41, the lugs are then occupying, the continued rotation of the driving shaft 26 in cooperation with the biasing spring 50 will cam the lugs downwardly against the opposing walls of the inclined grooves 44–46 to urge the sleeve 29 back down to its illustrated normal position. It will, of course, be appreciated that once the sleeve 29 is returned to its normal position, the lugs 36 and 37 will now be respectively occupying the next-adjacent ones of the longitudinal grooves, as at 38–41, so as to have shifted the rotor 42 to a different angular orientation in relation to the stator 43.

The incremental change in the angular position of the rotor 42 relative to the stator 43 that is accomplished each time the solenoid coil 47 is energized will, of course, be wholly dependent upon the angular spacing between adjacent ones of the longitudinal grooves, as at 38–41. Thus, if it is desired to selectively shift the phase relationship of the acoustic output signal by 90°, for example, the longitudinal grooves, as at 38–41, will be angularly spaced by one-fourth of the pitch angle or angular spacing between adjacent teeth or ports on the rotor 42. Similarly, to accomplish a phase shift of 180°, the spacing between the longitudinal grooves, as at 38–41, will be equal to one-half of the pitch angle between adjacent ports or teeth of the rotor 42 so that each momentary retardation of the rotor will simply reverse the phase of the acoustic output signal from the signaler 21.

Although various selected phase relationships can be attained with different angular spacings of the longitudinal grooves, as at 38–41, it is preferred in the present invention to arrange these grooves so as to achieve a phase shift in the acoustic signal of 180° each time the solenoid coil 47 is energized. Accordingly, as schematically illustrated in FIG. 5A, when the signaler 21 is operating in its usual fashion and the solenoid coil 47 is not energized, an acoustic output signal will be produced as shown at 56. This output signal 56 will, of course, by cyclic in nature; and, although it may not necessarily have the illustrated sinusoidal waveform, the signal will successively swing between alternating peaks of positive and negative polarities of a given amplitude commensurate with the particular design criteria of the rotor 42 and the stator 43. As previously discussed, at the maximum peaks of the signal 56, the teeth, as at 57, of the rotor 42 are angularly misaligned with the teeth, as at 58, of the stator 43; and the minimum peaks of the signal will occur each time these teeth are angularly aligned with one another. For purposes of illustration, the phase relationship of the output signal 56 with reference to a given standard is schematically represented at 59 in FIG. 5A.

As discussed above, actuation of the coupling means 24 for selectively changing the phase relationship of the acoustic output signal 56 of the signaler 21 is accomplished by momentarily applying an electrical data signal to the solenoid coil 47. Thus, as schematically illustrated in FIG. 5B, when the solenoid coil 47 is energized by an electrical data signal, as at 60, the solenoid armature 48 will be raised as required for shifting the sleeve 29 to its depicted elevated position (corresponding to the dashed-line position 31 shown in FIG. 2) so as to carry each of the lugs, as at 36, to the upper end of whichever one of the longitudinal grooves, as at 39, the lug is then occupying. Then, as previously described upon de-energization of the solenoid coil 47, continued rotation of the driving shaft 26 will carry the lug 36 downwardly along the next-adjacent inclined groove, as at 45, until the lug reaches the bottom of the next-adjacent longitudinal groove, as at 40, as illustrated in FIG. 5C.

It will be recognized, of course, that the character of the output signal from the signaler 21 will undoubtedly be erratic as diagrammatically depicted at 61 in FIG. 5B during the brief period that the lug 36 is moving downwardly from the groove 39 to the groove 40. Once, however, the lug 36 is disposed at the bottom of the next-adjacent longitudinal groove 40, the resulting acoustic output signal 62 will again be cyclic; and, except for its changed phase relationship, this signal will otherwise be identical to the previous output signal 56. To dramatize the change in the phase relationship of the output signals 56 and 62, a dashed signal 63 is shown in FIG. 5C to schematically illustrate that the phase relationship of the initial output signal 56 would have been unchanged if the coupling means 24 had not been selectively actuated. At any rate, once the coupling means 24 has operated, the new acoustic output signal 62 will continue uninterrupted. It will be noted that the net result of the shifing of the lug 36 from the longitudinal groove 39 to the longitudinal groove 40 will be to retard the rotor tooth 57 by one step in relation to the stator tooth 58; and that the phase relationship of the output signal 62 will be shifted by 180° in relation to the previous output signal 56 since the spacing between the longitudinal grooves is selected to be equivalent to one-half of the preiod at the design frequency of the signaler 21.

Upon reception of a second data pulse, as at 64, the solenoid coil 47 will be re-energized as illustrated in FIG. 5D so as to again shift the sleeve 29 and the lug 36 upwardly. Then, once the solenoid coil 47 is again de-energized, the lug 36 will be cammed downwardly along the inclined groove 46 by the continued rotation of the driving shaft 26. Hereagain, as illustrated by the anomaly at 65, there will be another indefinable or erratic signal during the brief delay occurring as the rotor 42 effectively stands still as the lug 36 is cammed downwardly through the inclined groove 46 to its junction with the next-adjacent longitudinal groove 41.

As depicted at 66 in FIG. 5E. once the lug 36 is in the next longitudinal groove 41, the resulting acoustic signal 67 will also be cyclic and will have been shifted through a phase angle of 180° in relation to the past signal 62. This will, of course, result in the third output signal 67 being in phase with the first output signal 56 and 180° out of phase in relation to the second signal 62. Thus, in the preferred embodiment of the present invention, sequential energizations of the solenoid coil 47 will result in progressively switching the phase relationships of the acoustic output signals, as at 56, 62 and 67, by successive 180° increments.

It will, of course, be recognized that various arrangements can be provided for the downhole circuitry 19 in the tool 10 as well as for the surface detecting-and-recording circuitry 25. However, in the preferred embodiment of the present invention, circuitry such as shown in FIG. 6 can be employed. As seen there, the downhole circuitry 19 includes motor-control circuitry 70 cooperatively arranged to drive the motor 22 at a substantially constant speed as required for producing an acoustic output signal, as at 71, of a selected frequency. Since the motor-control circuitry 70 is typical and the details of its particular arrangement are not relevant to the present invention, it is believed unnecessary to further describe this circuit. It should be noted in passing, however, that if the signaler 21 is one of those new and improved units disclosed in any of the three aforementioned copending applications, the motor-control circuitry 70 would also preferably include a motor-reversing circuit 72 as shown there. As far as providing a source of synchronizing signals for the motor-control circuitry 70, it is preferred to use the output pulses from a typical clock 73 which is included in the downhole circuitry 19.

As shown in FIG. 6, the downhole circuitry 19 further includes data-encoding circuitry 74 which is cooperatively arranged as required to accept measurements from the condition-responsive devices 17 and 18 and, by converting these measurements into a binary-coded train of appropriately-timed electrical pulses, selectively energizing the solenoid coil 47 for sequentially actuating the coupling means 24 as required to produce a phase-coded acoustic output signal, as at 71, from the signaler 21 which is a binary representation of the measurements. As will be subsequently explained in greater detail, the phase-coded output signal, as at 71, from the signaler 21 will be a continuous acoustic signal consisting of successive discrete portions each lasting over a constant time interval and having either one or the other of two predefined phase relationships.

In the preferred embodiment of the present invention, it is preferred to disregard the actual phase relationships of the successive portions of the acoustic signal 71 and instead determine only if a phase change has been made during each discrete time interval for identifying whether an "0" or a "1" binary bit is then being transmitted It will be seen, therefore, that any selected number of successive ones of these discrete signal portions can be considered as representing a binary "frame" or "word" of whatever length is deemed necessary to satisfy the data-measuring requirements of the tool 10. It should also go without saying that any number of individual measurements or repeated measurements of a selected condition can be obtained during a single measuring cycle and that the electronic circuitry of the tool 10 shown in FIG. 6 would simply be correspondingly arranged as required to accommodate the particular situation. However, for purposes of succinctly illustrating the principles of the present invention, it is assumed that only two downhole conditions are to be successively measured once during each measuring cycle and that the data representative of each measurement provided by the tool 10 can be adequately expressed as a five-bit binary number. It is also further assumed arbitrarily that a phase change in the output signal of the signaler 21 represents a binary "1" and the absence of a phase change during one of these discrete time intervals is representative of a binary "0".

Accordingly, in the illustrated embodiment of the tool 10 of the present invention, the data-encoding circuitry 74 is cooperatively arranged to sequentially sample the output of each of the two condition-measuring devices 17 and 18, convert each measurement to a composite group of timed electrical pulses respectively representing the "1" bits in a five-bit binary word, and then serially apply each of these encoded electrical pulses to the solenoid coil 47. In this manner, the acoustic output signal 71 from the signaler 21 during a given measuring cycle will be comprised of ten successive discrete waveform portions with each respectively lasting for a predetermined time interval and having a phase relationship individually representing the ten data bits which are being transmitted during that particular measurement cycle.

It will also be appreciated that some provision must be made for reliably separating the data bits conveyed by these ten successive waveform portions into their respective data words so that the signal 71 can be accurately translated or decoded at the surface. Accordingly, as will be subsequently explained in greater detail, the acoustic output signal 71 during a given measuring cycle is also cooperatively arranged to further include a binary sync word having a predetermined coded arrangement. This, of course, means that, for one thing, by selecting one or more sync words which would not be reasonably expected to correspond to typical data measurements, the correct reception of a first sync word at the proper time in a measurement cycle will make it reasonably certain that the data immediately following will be properly aligned in relation to the measurement frames comprising a given measuring cycle. In the illustrative example of the present invention shown in the drawings it is assumed that this sync word will also be made up of five bits. Thus, with the circuitry 74 shown in FIG. 6, the acoustic output signal 71 during each measuring cycle will be divided into fifteen successive discrete waveform portions of uniform duration with the phase relationships of the first five of these portions representing this coded sync word, the phase relationships of the next five of these waveforms representing the binary equivalent of the present measurement signal from the condition-responsive device 17, and the last five waveform portions being representative of the measurement signal from the other condition-responsive device 18.

To accomplish the necessary sequential control of the solenoid coil 47, the outputs of the condition-measuring devices 17 and 18 are coupled to a typical signal multiplexer 75 which is coupled by way of a suitable analog-to-digital converter 76 to the inputs of a parallel-input serial-output register 77. The output of the register 77 is coupled by way of a suitable driving amplifier 78 to the solenoid coil 47 for selectively actuating the coupling unit 24 to, for example, produce a phase change in the acoustic signal 71 each time a binary "1" is to be signaled. Although other arrangements could, of course, be employed, conventional circuitry, as at 79, can be provided for generating a selected sync word of a predetermined binary format each time this circuitry is enabled or triggered and outputing this fixed sync word to the parallel inputs of the register 77.

To control the sequencing of the data encoder 74, the clock 73 is operated at the desired bit-sampling rate "B" and is connected to the control gates of the A/D converter 76 and the register 77 for serially discharging the contents of the register as needed to accomplish the requisite actuation of the solenoid coil 47. Since the signal multiplexer 76 must be stepped only once for each five-bit data word obtained during a given measuring cycle, a "divide by 'B'" divider 89 is coupled between the output of the clock 73 and the control gate of the multiplexer. Similarly, since the sync word generator 79 needs to operate only once during a given measuring cycle, a "divide by 'N + 1'" divider 81 is coupled between the output of the divider 80 and the control inputs of the sync word generator as well as appropriate gates, as at 82, which isolate the sync word generator from the A/D converter 76. As indicated in FIG. 6, "N" represents the number of measurements to be made during a given cycle; and, where only one measurement is to be obtained from a given measuring device as at 17 and 18 during a given measurement cycle, "N" is equal to the number of condition-responsive devices on the tool 10.

Turning for the moment to FIG. 7, it will be seen that the timing diagram shown there schematically illustrates the operation of the several elements of the particular data-encoding circuitry 74 depicted in FIG. 6 during a given measuring cycle. It is believed that the timing diagram of FIG. 7 is essentially self-explanatory so that a detailed discussion is not necessary for those skilled in the art. It will be appreciated, of course, that in the particular example illustrated in this timing diagram, the sync word has been arbitarily selected to be all binary "1"s, the first data measurement obtained during this measuring cycle is assumed to be binarily expressed as "01011", and the second data measurement is assumed to be binarily expressed as "10101". Furthermore, for the sake of simplicity, it is also assumed that the same sync word is to be used in each measurement cycle.

Referring again to FIG. 6, it will be seen that the detecting-and-recording apparatus 25 at the surface includes a suitable pressure-responsive signal detector 83 cooperatively arranged for detecting the cyclic pressure variations developed in a conduit 84 coupled between the surface end of the drill string 11 and the discharge of the mud pump (not shown in FIG. 6) and converting these phase-coded acoustic signals into representative electrical analog signals. It will, of course, be recognized that the signal detector 83 can be any one of those shown in such patents as U.S. Pat. Nos. 3,309,656, 3,488,629, 3,555,504, 3,716,830 or 3,747,059, all of which are incorporated herein by reference.

To convert the phase-coded acoustic signal 71 to corresponding analog electrical signals, the surface apparatus 25 further includes signal-decoding means, such as a typical phase discriminator 85 coupled to a suitable signal-demultiplexing circuit 86, for successively converting the data conveyed by the acoustic signal 71 to a form appropriate for selectively operating recording means such as a typical analog signal recorder 87. The signal-decoding means included in the surface circuitry 25 depicted in FIG. 6 are generally arranged so that the phase discriminator 85 will continuously monitor the electrical analog output signal of the signal detector 83 for cooperatively producing a corresponding digital output signal representative of a change in the phase relationship of each discrete portion of the phase-coded acoustic signal 71 as that portion is received. It will, of course, be recognized from the previous description of the particular signal-encoding circuitry 74 shown in FIG. 6, that in this illustrated example the digital output signal from the phase discriminator 85 will consist of a binary-coded series of successive timed pauses and electrical pulses that, for a given measuring cycle, will respectively represent the "0"s and "1"s making up the sync word and the two data measurements from the transducer 17 and 18.

In the illustrated embodiment of the signal-decoding means, the phase discriminator 85 includes a typical peak detector 88 which preferably produces sharp pulses or squared signals representative of, for example, the positive half-cycles in the output signal from the signal detector 83. The output of the peak detector 88 is divided into a first signal path 89 which is connected directly to one input of a typical signal comparator 90 and a second signal path 91 which is connected to the other input of the comparator by way of a delay circuit 92. As indicated by the legend in the circuit diagram in FIG. 6, the delay circuit 92 is cooperatively arranged to delay the signal in the second signal path 91. Where the signaler 21 is arranged as shown in FIG. 2 to change the phase relationship of the acoustic signal 71 by 180° each time the solenoid coil 47 is energized, the delay circuit 92 will be adapted for delaying the signal in the second signal path 91 for a time interval corresponding to an odd multiple of one-half of the period of the acoustic output signal 71 and its electrical counterpart from the signal detector 83 (e.g., a delay equal to a phase shift of 180°). In this manner, the signal comparator 90 will be adapted for continuously comparing the peaks of two consecutive half-cycles of the output signal from the peak detector 88; and the comparator will produce an output signal only when there is an interruption or momentary variation in an otherwise-repetitive series of these half-cycles. As is typical, a one-shot 93 is coupled to the output of the signal comparator 90 for producing a uniform output pulse from the phase discriminator 85 whenever there is a phase change in the acoustic output signal 71.

Accordingly, as shown in FIG. 8, so long as there is no change in the phase relationship of the received acoustic signal 71 or its electrical counterpart 94 from the signal detector 83, uniform signals will be simultaneously applied to both of the inputs of the comparator 90 and there will be no output from the one-shot 93. On the other hand, when there is a change, as at 95, in the phase relationship of the output signal 94 from the acoustic signal detector 83, there will be a momentary, but detectable, anomaly in the output signal 96 of the peak detector 88 such as two closely-spaced consecutive output pulses 97 and 98. These two closely-spaced pulses 97 and 98 will, of course, be immediately applied to the input of the comparator 90 coupled to the first signal path 89. It will, of course, be recognized that the first pulse 97 is representative of the last cycle in the output signal 94 occurring before the anomaly 95 and the second pulse 98 is representative of the first cycle in the output signal occurring after this anomaly. However, by virtue of the time lag in the second signal path 91 provided by the delay circuit 92, there will be a momentary inequality between the signals being applied to the two inputs of the signal comparator 90 when the delayed pulse 99 in the second signal path 91 corresponding to the first pulse 97 in the first signal path 89 does not coincide in time with the second pulse 98. This momentary unbalance applied to the inputs of the comparator 90 will selectively trigger the one-shot 93 for producing a corresponding output pulse, as at 100, each time there is a phase reversal in the acoustic output signal 71.

It will be recognized, therefore, that an output pulse, as at 100, will be produced from the phase discriminator 85 only upon a change in the phase relationship of the acoustic output signal 71. Thus, each time a binary "1" is received, for example, the phase discriminator 85 will produce an output pulse, as at 100. On the other hand, there will be no output from the phase discriminator 85 when a binary "0" is received. In this manner, by determining whether or not there has been a phase change during each of the fifteen discrete time intervals comprising a given measuring cycle in the exemplary situation illustrated in the drawings, the phase discriminator 85 functions to supply an encoded digital signal to the signal demultiplexer 86. The signal supplied to the demultiplexer 86 during a given measuring cycle will, of course, be in the form of fifteen successive pauses or pulses, as at 100, to respectively represent the binary bits being transmitted during this measuring cycle.

As shown in FIG. 6, to provide a uniform input signal to the signal demultiplexer 86, it is preferred to couple the one-shot 93 in the phase discriminator 85 to one input of an AND gate 101 having its other input coupled to a clock 102 operating at the same pulse rate as the clock 73 in the data-encoding circuitry 74. It will, of course, be recognized that a pulse representative of a binary "1" will be produced at the output of the gate 101 only when the one-shot 93 has enabled this gate and a pulse from the clock 102 is applied to the other input of this gate. However, since the output signals from the one-shot 93 will be representative of the pulse rate of the downhole clock 73, the output of the phase discriminator 85 is coupled to the uphole clock 102 by a typical phase-lock control 103 so as to maintain the two clocks in synchronization.

The signal demultiplexer 86 is cooperatively arranged to temporarily store the successive bits representative of the measurement signal from the two downhole transducers 17 and 18; and, after testing the two sync words received immediately preceding and following these two measurement signals, outputting these measurement signals to the recorder 87 only when both of these two sync words have been correctly received. Accordingly, in the illustrative embodiment of the demultiplexing circuit 86 shown in FIG. 6, this is accomplished by coupling the output of the gate 101 to the input of a typical serial-input parallel-output register 104 having the capability to simultaneously store fifteen bits. As illustrated, the register 104 is divided into a "sync word" section 105 and two "data word" sections 106 and 107. As is typical, the two data word register sections 106 and 107 are respectively coupled to the recorder 87 by temporary storage registers 108 and 109 and typical D/A converters 110 and 111. As mentioned above, data stored in the data word register sections 106 and 107 is transferred by way of the registers 108 and 109 to the recorder 87 only when the sync words received immediately before and after the two data measurements each correctly correspond to the predetermined sync word which is being periodically transmitted by the downhole sync word generator 79.

Accordingly, to verify the correctness of the sync words being successively supplied to the demultiplexer 86, the demultiplexer is cooperatively arranged to continuously check the contents of the sync word register section 105 to determine when a sync word has been correctly received. To accomplish this, the illustrative embodiment of the demultiplexer 86 shown in FIG. 6 is arranged to include an AND gate 112 having its five inputs respectively coupled to each of the outputs of the sync word register section 105. The output of the gate 112 is coupled to a one-shot 113 having a divided output coupled to one input of an AND gate 114 and, by way of a delay circuit 115, to the "set" input of a typical flip-flop 116. The output of the flip-flop 116 is connected to one input of an AND gate 117 having its other input connected to the clock 102.

It will, therefore, be appreciated that the AND gate 112 will be enabled for producing an output pulse from the one-shot 113 only when the sync word register section 105 contains five consecutive binary "1"s (i.e., in the illustrated example, the arbitrary sync word being repetitively produced by the downhole sync word generator 79). Those skilled in the art will, of course, recognize that if the predetermined sync word instead included one or more binary "0"s, an inverter (not shown) could be coupled into the appropriate output line or lines between the sync word register section 105 and the gate 112. Similarly, for purposes of versatility, an inverter (not shown) could also be placed in each of the output lines from the sync word register section 105 and appropriate switches (not shown) could be arranged for either manually or automatically switching these inverters in and out of the appropriate output lines of this register section as required to properly respond to the arrival of sync words containing binary "0"s.

In any event, with the demultiplexing circuit 86 arranged as illustrated in FIG. 6, the sync word register section 105 must simultaneously contain five successively-received binary "1"s before the gate 112 and the one-shot 113 are enabled. As illustrated by the timing diagram shown in FIG. 9, once the first sync word is correctly received in the sync word register section 105, the one-shot 113 is enabled (as at 118) to start the flip-flop 116 a short time later (as at 119). The significance of this brief delay provided by the delay circuit 115 will subsequently be explained. It should be noted that the inputing of this output pulse 118 to the gate 114 will not enable this gate at this time. Once the flip-flop 116 is enabled, however, the gate 117 will also be enabled for inputing pulses, as at 120 in FIG. 9, from the clock 102 to a "B(N + 1)" divider 121 (FIG. 6). In the illustrative example of the present invention shown in the drawings where "B" is equal to five and "N" is equal to two, this, of course, means that the divider 121 will not provide an output pulse, as at 122 in FIG. 9, until the fifteenth clock pulse is applied to the AND gate 117. When this occurs, the resulting output pulse 122 from the divider 121 will be simultaneously applied to the "reset" input of the flip-flop 116 and to the input of a one-shot 123 which is coupled to the other input of the AND gate 114. The output of the gate 114 is divided and coupled to the "reset" inputs of the storage registers 108 and 109 as well as to a delay circuit 124 coupled to the "reset" input of the register 104.

Accordingly, it will be appreciated that the arrival of the first sync word in the sync word register section 105 will simply start the flip-flop 116 to ultimately produce an output pulse, as at 125 in FIG. 9, from the one-shot 123 when fifteen (i.e., B times N + 1) pulses are emitted by the clock 102. Since the AND gate 114 will not be enabled until there is a signal present at each of its two inputs, this, of course, means that when the one-shot 123 is momentarily enabled by the output pulse 122 from the divider 121, there must also be an output pulse, as at 126, from the one-shot 113 at the same time before the gate 114 will be enabled. Thus, to produce this second output pulse 125, the AND gate 112 must be enabled at the time that the one-shot 123 is enabled by the divider output pulse 122. As previously described, the AND gate 112 will, however, be enabled only when the sync word register section 105 then contains five binary "1"s which will, of course, occur only upon the successful reception of the second sync word.

Thus, the demultiplexer circuitry 86 is cooperatively arranged for verifying the correct reception of the first sync word in the sync word register section 105 as well as, by virtue of the corresponding initiation of the flip-flop 116 for operation during a time interval equal to one measurement cycle, allowing the register 104 to be filled with the next successively-arriving fifteen bits which respectively represent the two immediately-following data words and the next-arriving sync word. Then, since it may be reasonably assumed that the successful reception of two consecutive sync words will mean that the two intervening data measurements were also accurately received by the register 104, the successful arrival of the second sync word into the register section 105 will be cooperative for enabling the gate 114 to simultaneously discharge the contents of the two data registers 108 and 109 to the recorder 87 and reset the flip-flop 116. Then, shortly thereafter, by virtue of the delay circuit 124, the output of the gate 114 will clear the register 104 by applying a transfer pulse, as at 127, to the "reset" input of this register. It will be recognized that the delay 124 functions to allow the accurate reception of the second sync word to restart the flip-flop 116 so that if the next-consecutive or third sync word is also correctly received, the next set of measurement data which was transferred into the register 104 during the intervening time period will subsequently be transferred to the recorder 87.

It will be appreciated, therefore, that the demultiplexing circuitry 86 is self-validating and will reliably function to continuously check or determine whether each successively-transmitted sync word is correctly received. If two successive sync words are correctly received, the two data words which have entered the register 104 during the time interval elapsing between the reception of these two sync words will be transferred to the recorder 87 since it may be safely assumed that these two data words were also correctly received. As previously described, the first arrival of the five consecutive binary bits in the sync word register section 105 which accurately correspond to the predetermined sync word being produced by the downhole sync word generator 79 will simply start the flip-flop 116 for subsequently producing an output pulse, as at 125, whenever sufficient time has elapsed for the two following data measurements and the next sync word supplied to the register 104. At this time, a check is made to now establish if the next-successive sync word which is then in the register section 105 has also been correctly received. If so, the gate 114 is enabled by the pulses 125 and 126, the data in the registers 108 and 109 is transferred to the recorder 87, and the demultiplexing circuit 86 is readied to accept the next set of data from the next-successive measuring cycle. It will be realized, of course, that this will be accomplished by restarting the flip-flop 116 as shown at 128 in FIG. 9.

It will, however, be recognized that the signals received by the demultiplexer 86 may not always be accurately received. For example, the transmission of acoustic signals, as at 71, from the new and improved tool 10 may be temporarily garbled for one reason or another. Should this occur, it will be appreciated that one or more of the successively-transmitted sync words may not be accurately received by the surface equipment 25. If, for example, an incorrect sync word is received, the one-shot 113 will simply not be enabled to produce a pulse, as at 118 or 126, so long as the sync word register section 105 contains a faulty sync word. This will, of course, result in the faulty sync word being progressively removed from the register 104 as additional signal pulses are received from the phase discriminator 85. The demultiplexer 86 will, therefore, prevent the transfer of potentially-unreliable data to the recorder 87 so long as the contents of the sync word register section 105 at selected time intervals do not correspond to the predetermined sync word which is being periodically generated by the sync word generator 79 in the new and improved tool 10.

Accordingly, no data will be recorded by the recorder 87 so long as the periodic sync words are not being correctly received at the surface. On the other hand, should a correct sync word be received which is then followed by an incorrectly-received sync word, although the flip-flop 116 will be enabled to subsequently produce an output pulse, as at 125, from the one-shot 123, the incorrect second sync word will cause the gate 114 to remain inactive when this output pulse is received since the one-shot 113 will not produce a second pulse, as at 126. In addition to not transferring the contents of the registers 108 and 109, when this occurs the flip-flop 116 will not be restarted and the demultiplexer 86 will simply continue to pass over the subsequent data words until two successive sync words are correctly received.

Accordingly, it will be appreciated that the present invention has provided new and improved means for reliably producing phase-coded acoustic signals for transmission to suitable surface recording apparatus. By arranging the rotating element of an otherwise typical siren signaler to be selectively shifted between different angular positions in relation to the fixed element of the signaler the resulting acoustic signal will be produced at different phase relationships. In this manner, either by detecting the particular phase relationship of each successive portion of the signal or by simply detecting changes in these phase relationships, a binary-coded data signal can be reliably transmitted at high signaling rates to the surface without it being necessary to employ complex circuits.

While only a particular embodiment of the present invention has been shown and described, it is apparent that changes and modifications may be made without departing from this invention in its broader aspects; and, therefore, the aim in the appended claims is to cover all such changes and modifications as fall within the true spirit and scope of this invention.

What is claimed is:

1. Apparatus adapted for measuring at least one downhole condition while drilling a borehole and comprising:
   a body tandemly coupled in a tubular drill string having a borehole-drilling device dependently coupled thereto and defining a fluid passage for circulating drilling fluids between the surface and said borehole-drilling device;
   data-signaling means on said body and adapted for producing digital data signals representative of at least one downhole condition;
   acoustic-signaling means on said body and including a flow-directing member disposed in said fluid passage and having a plurality of spaced openings cooperatively arranged for directing drilling fluids in selected fluid paths along said fluid passage, a rotatable flow-obstructing member in said fluid passage and having a plurality of alternately-distributed angularly-spaced openings and obstructions cooperatively arranged to successively cross said fluid paths upon rotation of said flow-obstructing member for producing cyclic acoustic signals in drilling fluids flowing through said fluid passage, and motor means adapted for rotating said signal-producing member; and
   coupling means co-rotatively intercoupling said motor means to said signal-producing member and operable in response to said digital signals for selectively shifting said signal-producing member between selected angular orientations during the continued rotation thereof to vary the phase of said acoustic signals in accordance with said digital signals, said coupling means including first and second rotatable shafts coaxially journalled on said body and respectively coupled to said motor means and said signal-producing member, first means on one of said shafts providing a continuous alternating track extending therearound and having a plurality of generally-longitudinal track portions which are angularly spaced around said one shaft for respectively defining said selected angular orientations of said signal-producing member and a plurality of generally-inclined track portions which are respectively spaced around said one shaft between said generally-longitudinal track portions for interconnecting the upper end of that generally-longitudinal track portion on one side of that generally-inclined track portion to the lower end of that generally-longitudinal track portion on the other side of that generally-inclined track portion, second means on the other one of said shafts including a cam member slidably mounted on said other shaft and adapted for movement along said alternating track to position said signal-producing member in its said angular orientations, and means co-rotatively coupling said cam member to said other shaft for reciprocating movement therealong between an upper position where said cam member is aligned with said upper ends of said generally-longitudinal trck portions and a lower position where said cam member is aligned with said lower ends of said generally-longitudinal track portions, stop means cooperatively arranged at the junctions of said generally-longitudinal track portions and said generally-inclined track portions for preventing the return of said cam member into whichever one of said track portions said cam member has just left until said cam member has moved completely around said one shaft, biasing means normally urging said cam member into one of its said upper and lower positions where rotation of said first shaft will keep said cam member from leaving that one of said generally-longitudinal track portions it is then disposed within for selectively maintaining said signal-producing member in its selected angular orientation corresponding to that one of said generally-longitudinal track portions, and cam-actuating means operable in response to said digital signals for selectively moving said cam member to the other of its said upper and lower positions where rotation of said first shaft will carry said cam member out of that one of said generally-longitudinal track portions it is then disposed within and into the adjacent one of said generally-inclined track portions to the next-adjacent one of said generally-longitudinal track portions to selectively shift said signal-producing member to another one of its selected angular orientations.

2. The apparatus of claim 1 wherein said cam-actuating means include:
   an electrical solenoid actuator electrically connected to said data-signaling means and cooperatively arranged for shifting said cam member to one of its said upper and lower positions in response to at least one of said digital data signals.

3. The apparatus of claim 1 further including:
   means adapted for connection to the surface end of said drill string for detecting at least changes in the phase of said acoustic signals to provide indications at the surface representative of said downhole condition.

4. The apparatus of claim 1 wherein said stop means include:

a shoulder defined at the junction of each of said generally-inclined track portions with the upper end of each of said generally-longitudinal track portions.

5. The apparatus of claim 1 wherein said stop means include:
a shoulder defined at the junction of each of said generally-inclined track portions with the lower end of each of said generally-longitudinal track portions.

6. The apparatus of claim 1 wherein said stop means include:
a first shoulder defined at the junction of each of said generally-inclined track portions with the upper end of each of said generally-longitudinal track portions; and
a second shoulder defined at the junction of each of said generally-inclined track portions with the lower end of each of said generally-longitudinal track portions.

7. Apparatus adapted for transmitting data to the surface during the drilling of a borehole and comprising:
a body adapted for connection in a tubular drill string and having a fluid passage arranged to conduct drilling fluids between the surface and a borehole-drilling device dependently coupled therebelow:
a flow director cooperatively arranged in said fluid passage and including at least one opening for directing drilling fluids flowing through said fluid passage along a selected axis;
a signal-producing member coaxially arranged for rotation in said fluid passage and including a plurality of alternately-disposed openings and obstructions angularly spaced from one another and respectively adapted to successively cut across said axis upon rotation of said signal-producing member for producing cyclic acoustic signals in a drilling fluid flowing through said fluid passage;
motor means adapted for rotating said signal-producing member; and
data-transmitting means including coupling means corotatively intercoupling said motor means to said signal-producing member and operative in response to electrical data signals for selectively shifting said signal-producing member between selected angular orientations during the continued rotation thereof to produce detectable changes in the phase relationships of said acoustic signals representative of such electrical data signals, said coupling means including first and second rotatable shafts coaxially journalled on said body and respectively coupled to said motor means and said signal-producing member, first means on one of said shafts providing a continuous alternating track extending therearound and having a plurality of generally-longitudinal track portions which are angularly spaced around said one shaft for respectively defining said selected angular orientations of said signal-producing member and a plurality of generally-inclined track portions which are respectively spaced around said one shaft between said generally-longitudinal track portions for interconnecting the upper end of that generally-longitudinal track portion on one side of that generally-inclined track portion to the lower end of that generally-longitudinal track portion on the other side of that generally-inclined track portion, second means on the other one of said shafts including a cam member slidably mounted on said other shaft and adapted for movement along said alternating track to position said signal-producing member in its said angular orientations, and means co-rotatively coupling said cam member to said other shaft for reciprocating movement therealong between an upper position where said cam member is aligned with said upper ends of said generally-longitudinal track portions and a lower position where said cam member is aligned with said lower ends of said generally-longitudinal track portions, stop means cooperatively arranged at the junctions of said generally-longitudinal track portions and said generally-inclined track portions for preventing the return of said cam member into whichever one of said track portions said cam member has just left until said cam member has moved completely around said one shaft, biasing means normally urging said cam member into one of its said upper and lower positions where rotation of said first shaft will keep said cam member from leaving that one of said generally-longitudinal track portions it is then disposed within for selectively maintaining said signal-producing member in its selected angular orientation corresponding to that one of said generally-longitudinal track portions, and cam-actuating means operable in response to said digital signals for selectively moving said cam member to the other of its said upper and lower positions where rotation of said first shaft will carry said cam member out of that one of said generally-longitudinal track portions it is then disposed within and into the adjacent one of sid generally-inclined track portions to the next-adjacent one of said generally-longitudinal track portions to selectively shift said signal-producing member to another one of its selected angular orientations.

8. The apparatus of claim 7 wherein said cam-actuating means include:
an electrical solenoid actuator cooperatively arranged for shifting said cam member to one of its said upper and lower positions in response to at least one of such electrical data signals.

9. The apparatus of claim 7 wherein said stop means include:
a shoulder defined at the junction of each of said generally-inclined track portions with the upper end of each of said generally-longitudinal track portions.

10. The apparatus of claim 7 wherein said stop means include:
a shoulder defined at the junction of each of said generally-inclined track portions with the lower end of each of said generally-longitudinal track portions.

11. The apparatus of claims 7 wherein said stop means include:
a first shoulder defined at the junction of each of said generally-inclined track portions with the upper end of each of said generally-longitudinal track portions; and
a second shoulder defined at the junction of each of said generally-inclined track portions with the lower end of each of said generally-longitudingal track portions.

12. Apparatus adapted for transmitting data to the surface by way of drilling fluids during the drilling of a borehole and comprising:

a flow director having at least one opening for directing drilling fluids flowing therethrough along a selected axis;

a signal-producing member coaxially arranged for rotation adjacent to said flow director and including a plurality of alternately-disposed openings and obstructions angularly spaced from one another and respectively adapted to successively cut across said axis upon rotation of said signal-producing member for producing cyclic acoustic signals in a drilling fluid flowing therepast;

motor means adapted for rotating said signal-producing member; and data-transmitting means including coupling means corotatively intercoupling said motor means to said signal-producing member and operative in response to electrical data signals for selectively shifting said signal-producing member between selected angular orientations during the continued rotation thereof to produce detectable changes in the phase relationships of said acoustic signals representative of such electrical data signals, said coupling means including first and second rotatable shafts coaxially journalled in relation to one another and respectively coupled to said motor means and said signal-producing member, first means on one of said shafts providing a continuous alternating track extending therearound and having a plurality of generally-longitudinal track portions which are angularly spaced around said one shaft for respectively defining said selected angular orientations of said signal-producing member and a plurality of generally-inclined track portions which are respectively spaced around said one shaft between said generally-longitudinal track portions for interconnecting the upper end of that generally-longitudinal track portions on one side of that generally-inclined track portion to the lower end of that generally-longitudinal track portion of the other side of that generally-inclined track portions, second means on the other one of said shafts including a cam member slidably mounted on said other shaft and adapted for movement along said alternating track to position said signal-producing member in its said angular orientations, and means co-rotatively coupling said cam member to said other shaft for reciprocating movement therealong between an upper position where said cam member is aligned with said upper ends of said generally-longitudinnal track portions and a lower position where said cam is aligned with said lower ends of said generally-longitudinal track portions; stop means cooperatively arranged at the junctions of said generally-longitudinal track portions and said generally-inclined track portions for preventing the return of said cam member into whichever one of said track portions said cam member has just left until said cam member has moved completely around said one shaft, biasing means normally urging said cam member into one of its said upper and lower positions where rotation of said first shaft will keep said cam member from leaving that one of said generally-longitudinal track portions it is then disposed within for selectively maintaining said signal-producing member in its selected angular orientation corresponding to that one of said generally-longitudinal track portions, and cam-actuating means operable in response to electrical data signals for selectively moving said cam member to the other of its said upper and lower positions where rotation of said first shaft will carry said cam member out of that one of said generally-longitudinal track portions it is then disposed within and into the adjacent one of said generally-inclined track portions to the next-adjacent one of said generally-longitudinal track portions to selectively shift said signal-producing member to another one of its selected angular orientations.

13. The apparatus of claim 12 wherein said cam-actuating means include:

an electrical solenoid actuator electrically connected to said data-signaling means and cooperatively arranged for shifting said cam member to one of its said upper and lower positions in response to at least one of such electrical data signals.

14. The apparatus of claim 12 wherein said stop means include:

a shoulder defined at the junction of each of said generally-inclined track portions with the upper end of each of said generally-longitudinal track portions.

15. The apparatus of claim 12 wherein said stop means include:

a shoulder defined at the junction of each of said generally-inclined track portions with the lower end of each of said generally-longitudinal track portions.

16. The apparatus of claim 12 wherein said stop means include:

a first shoulder defined at the junction of each of said generally-inclined track portions with the upper end of each of said generally-longitudinal track portions; and a second shoulder defined at the junction of each of said generally-inclined track portions with the lower end of each of said generally-longitudinal track portions.

* * * * *